(12) United States Patent
Wang et al.

(10) Patent No.: US 8,749,984 B2
(45) Date of Patent: Jun. 10, 2014

(54) ELECTRONIC DEVICE

(75) Inventors: Wei-Cheng Wang, New Taipei (TW);
Po-Yuan Hsu, New Taipei (TW);
Chen-Yu Li, New Taipei (TW);
Hsing-Wang Chang, New Taipei (TW)

(73) Assignee: Wistron Corporation (TW)

( * ) Notice: Subject to any disclaimer, the term of this patent is extended or adjusted under 35 U.S.C. 154(b) by 271 days.

(21) Appl. No.: 13/328,066

(22) Filed: Dec. 16, 2011

(65) Prior Publication Data
US 2012/0188740 A1 Jul. 26, 2012

(30) Foreign Application Priority Data

Jan. 21, 2011 (TW) .............................. 100201424 U

(51) Int. Cl.
*H05K 7/02* (2006.01)
*H05K 7/12* (2006.01)

(52) U.S. Cl.
USPC ...... 361/732; 361/679.38; 361/798; 361/807; 361/728; 361/731; 361/740; 361/747

(58) Field of Classification Search
USPC ......... 361/798, 807, 728, 731, 732, 740, 747, 361/679.38
See application file for complete search history.

(56) References Cited

U.S. PATENT DOCUMENTS

| | | | | |
|---|---|---|---|---|
| 5,600,542 A * | 2/1997 | Malgouires | .................. | 361/732 |
| 5,793,614 A * | 8/1998 | Tollbom | ....................... | 361/732 |
| 6,147,872 A * | 11/2000 | Roy | .............................. | 361/754 |
| 6,407,911 B1 * | 6/2002 | Spence et al. | .............. | 361/679.3 |
| 6,916,190 B2 * | 7/2005 | Joist | ............................... | 439/160 |
| 6,919,510 B1 * | 7/2005 | Chen | ............................... | 174/66 |
| 7,158,376 B2 * | 1/2007 | Richardson et al. | ...... | 361/679.56 |
| 7,648,043 B2 * | 1/2010 | Chen | ........................... | 220/825 |
| 7,789,437 B2 * | 9/2010 | Sheng | .......................... | 292/137 |
| 7,986,530 B2 * | 7/2011 | Chang et al. | .................. | 361/747 |
| 8,339,793 B2 * | 12/2012 | Tsai et al. | ...................... | 361/752 |
| 2006/0067035 A1* | 3/2006 | Hamada et al. | ............... | 361/680 |
| 2008/0125197 A1* | 5/2008 | Hongo et al. | .............. | 455/575.3 |
| 2009/0109635 A1 | 4/2009 | Chen et al. | | |
| 2009/0260844 A1* | 10/2009 | Tseng | .......................... | 174/50.5 |
| 2011/0075338 A1* | 3/2011 | Tang et al. | ................. | 361/679.4 |
| 2011/0075381 A1* | 3/2011 | Chang et al. | .................. | 361/747 |

\* cited by examiner

*Primary Examiner* — Anatoly Vortman
(74) *Attorney, Agent, or Firm* — Rajesh Vallabh; Foley Hoag LLP

(57) ABSTRACT

An electronic device includes a main body, an electronic assembly and an ejecting mechanism. The main body is formed with a retaining space, and the electronic assembly is retained in the retaining space of the main body. The ejecting mechanism includes an operating member that has a main portion and a connecting portion disposed on the main portion. The operating member is rotatable on the connecting portion and is disposed in the main body while the lifting section is disposed between the main body and the electronic assembly. The operating section is operable to drive the lifting section to push the electronic assembly out of the retaining space.

10 Claims, 5 Drawing Sheets

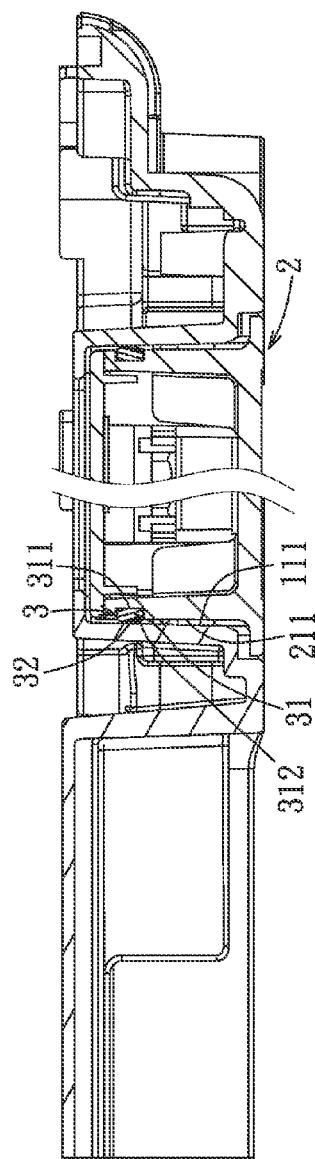
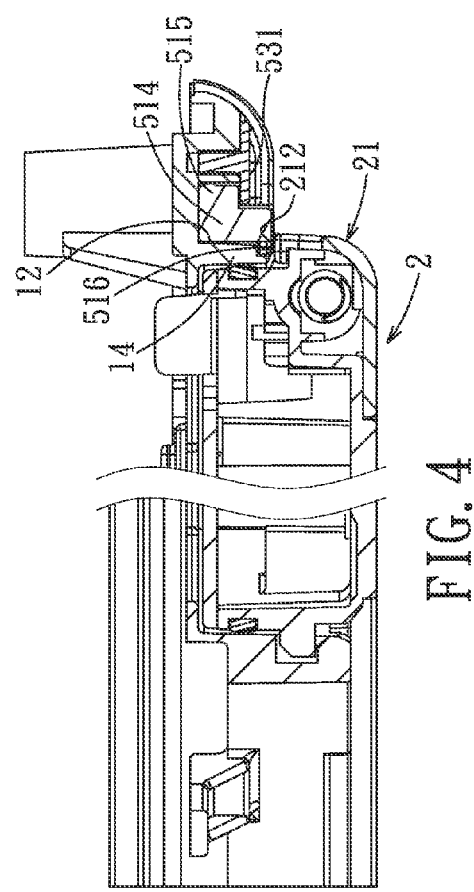

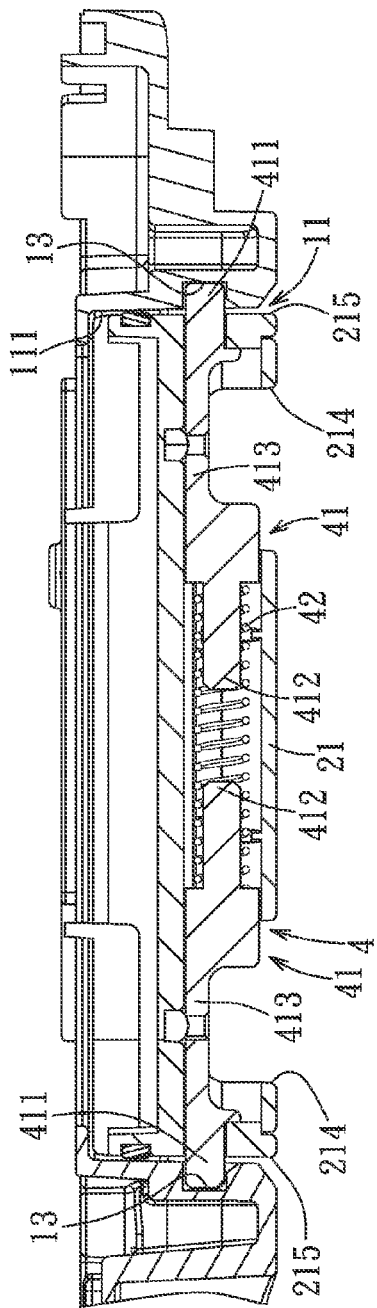

ELECTRONIC DEVICE

CROSS-REFERENCE TO RELATED APPLICATION

This application claims priority of Taiwanese Application No. 100201421, filed on Jan. 21, 2011, the disclosure of which is incorporated herein by reference.

BACKGROUND OF THE INVENTION

1. Field of the Invention

The invention relates to an electronic device, more particularly to an electronic device in a detachable electronic assembly.

2. Description of the Related Art

Some portable electronic devices, such as portable computers, must have a waterproof function because of the special operating circumstances under which they work. One way for the portable electronic devices to achieve such function is to install seal element made of rubber (as disclosed in U.S. patent application publication No. 2009/0109635 for example).

The seal element must be disposed between and abut tightly against two parts to fully perform its waterproof function. In the case where the two parts are separable, however, such tight abutment may increase friction between the two carts, thereby increasing the difficulty to separate the two parts, (e.g., a mobile hard drive and a main body of a portable electronic device mounted separably with the mobile hard drive.)

SUMMARY OF THE INVENTION

Therefore, the object of the present invention is to provide an electronic device with a mechanism that assists in detaching an electronic assembly from a main body of the electronic device, particularly under a circumstance that a waterproof element is provided between the electronic assembly and the main body, such that the friction between the electronic assembly and main body is increased.

According to the present invention, an electronic device comprises a main body, an electronic assembly and an ejecting mechanism. The main body is formed with a retaining space, and the electronic assembly is retained removably in the retaining space of the main body. The ejecting mechanism includes an operating member that has a main portion and a connecting portion disposed on the main portion. The main portion has a lifting section and an operating section that is connected to the lifting section. The connecting portion is located between the lifting and operating sections. The operating member is rotatable on the connecting portion and is disposed in the main body at a position adjacent to the retaining space while the lifting section is disposed between the main body and the electronic assembly. The operating section is operable by a force to rotate in a pushing direction to drive the lifting section to push the electronic assembly out of the retaining space.

The effect of the present invention is, with the presence of the ejecting mechanism, the electronic assembly can be handily pushed out of the retaining space by pushing the operation member of the electing mechanism.

Furthermore, with the presence the ejecting mechanism, even when the electronic assembly further includes a waterproofing element that is sleeved on the electronic assembly and abuts against the inner surrounding surface, the removal of the electronic assembly will not be obstructed by the friction of the waterproofing element between the electronic assembly and the main body.

Preferably, the main body has an inner surrounding surface that defines the retaining space. The electronic assembly has an outer surrounding surface that faces the inner surrounding surface when the electronic assembly is retained in the retaining space. The electronic device further comprises a waterproofing element that is sleeved on the outer surrounding surface of the electronic assembly and that abuts against the inner surrounding surface of the main body when the electronic assembly is retained in the retaining space.

Preferably, the waterproofing element is configured to have a substantially T-shaped cross-section, and has a surrounding body with an external surface and a flange protruding from the external surface. The surrounding body is sleeved on the outer surrounding surface of the electronic assembly, and the flange abuts against the inner surrounding surface of the main body.

Preferably, the main body is further formed with a first groove adjacent to the retaining space, and the operating member is disposed in the first groove.

Preferably, the main body further has a base surface defining the first groove, a block protruding from the base surface, and a second groove formed in the block. The connecting portion of the operating member is configured as an axle projecting from the main portion of the operating member and inserting rotatably in the second groove so as to locate rotatably the operating member in the first groove.

Preferably, the main portion of the operating member extends in a longitudinal direction. The connecting portion has a projecting segment projecting in a (direction substantially transverse to the longitudinal direction. The ejecting mechanism further includes a securing component that is disposed in the main body and that has a shaft part, and a head part extending radially from one end of the shaft part. The projecting segment is disposed between the second groove and the head part of the securing component.

Preferably, the ejecting mechanism further includes a spring member disposed in the first groove and having opposite ends that abut resiliently and respectively against the base surface of the main body and the main portion of the operating member.

Preferably, a cross-section of the operating section of the operating member in the longitudinal, direction is wedge-shaped.

Preferably, the electronic device further comprises an engaging mechanism mounted in the electronic assembly and includes an engaging member and a resilient member. The engaging member is mounted movably in the electronic assembly and that has an operating part accessibly exposed from the electronic assembly, and a first end part extending outwardly of the outer surrounding surface of the electronic assembly. The resilient member is disposed in the electronic assembly and biases the first end part to extend resiliently and outwardly of the outer surrounding surface of the electronic assembly. The inner surrounding surface of the main body is formed with an engaging recess for engaging removably the first end part of the engaging member.

Preferably, the electronic assembly has a front end portion mounted with the engaging mechanism. The operating member is disposed between the front end portion and the main body.

Preferably, the main body further has a dividing wall separating the retaining space from the first groove. The electronic assembly has a front end portion formed with a stepped surface that is adjacent to the dividing wall when the electronic assembly is retained in the retaining space. The lifting section of the main portion of the operating member has a lateral protrusion that protrudes laterally therefrom and that is disposed between the stepped surface and the dividing wall when the electronic assembly is retained in the retaining space. The operating section is operable by a force to rotate in a pushing direction to drive the lateral protrusion to push the electronic assembly out of the retaining space.

BRIEF DESCRIPTION OF THE DRAWINGS

Other features and advantages of the present invention will become apparent in the following detailed description of the embodiment with reference no the accompanying drawings, of which:

FIG. 3 is a fragmentary sectional view of the embodiment illustrating a waterproofing element disposed between and abutting against a main body and an electronic assembly;

FIG. 4 is another fragmentary sectional view of the embodiment illustrating the relative locations of a front end portion of the main body and an operating member of an ejecting mechanism;

FIG. 5 is still another fragmentary sectional view of the embodiment illustrating an engaging mechanism;

FIG. 6 is a perspective view of the operating member the embodiment; and

DETAILED DESCRIPTION OF THE PREFERRED EMBODIMENT

Figure 1:
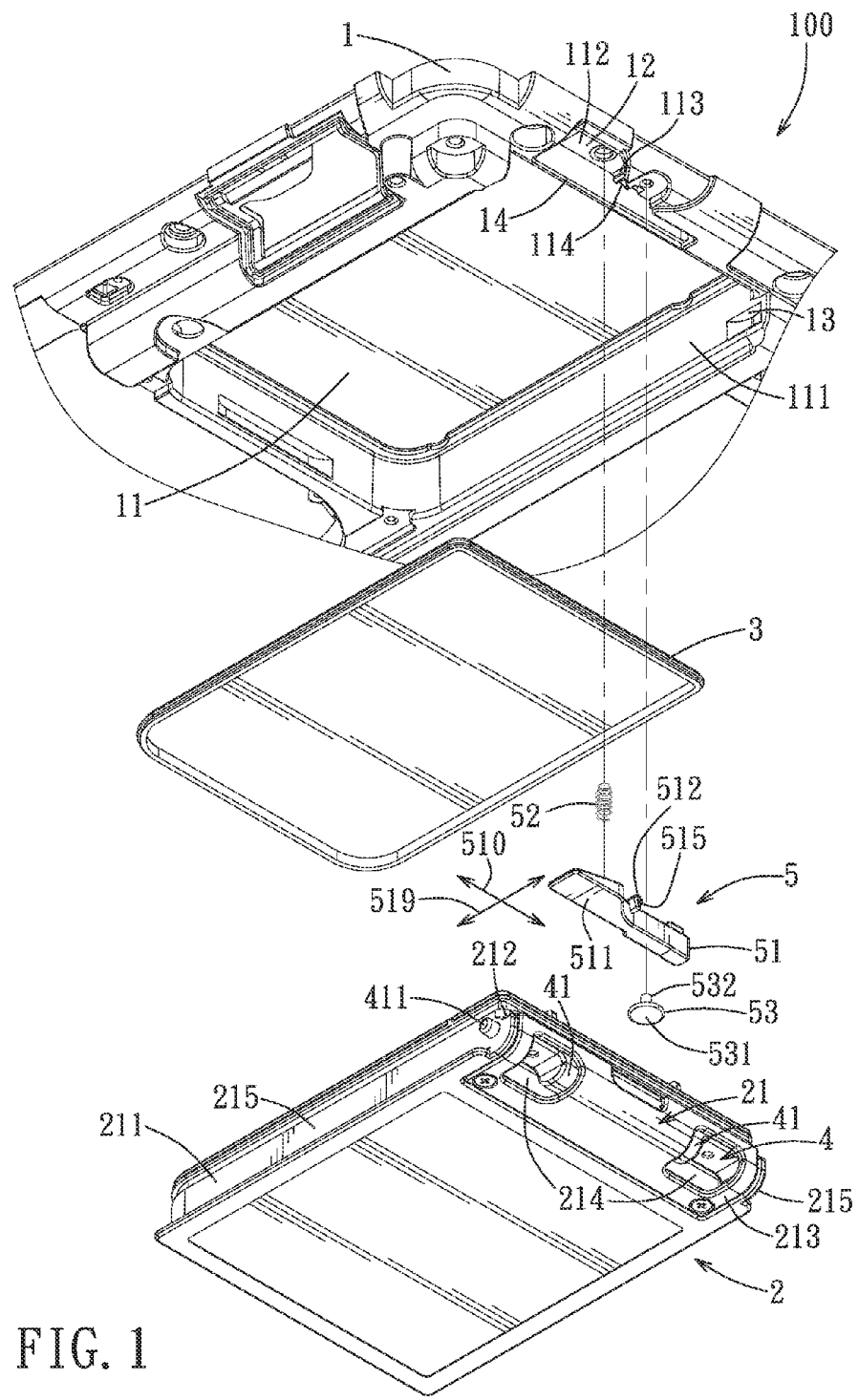
FIG. 1 is a fragmentary exploded perspective view of an embodiment of an electronic device according to the invention.

As shown in FIG. 1, the embodiment of an electronic device 100 according to the present invention includes a main body 1, an electronic assembly 2, a waterproofing element 3, an engaging mechanism 4 and an ejecting mechanism 5. The electronic device 100 in the embodiment is configured as a portable computer and only a part of the main body 1 is shown in the figures.

The main body 1 is formed with a retaining space 11. Particularly, the main body 1 has an inner surrounding surface 111 that defines the retaining space 11. Additionally, the main body 1 is further formed with a first groove 12 adjacent to the retaining space 11, and further has a dividing wall 14 separating the retaining space 11 from the first groove 12, a base surface 112 defining the first groove 12, a block 113 protruding from the base surface 112, and a second groove 114 formed in the block 113.

Figure 2:
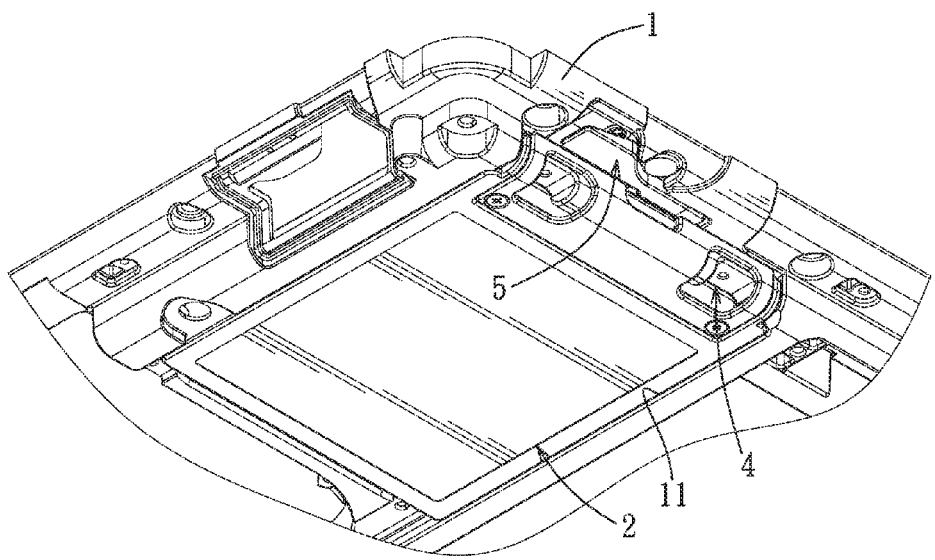
FIG. 2 is a fragmentary assembled perspective view of the embodiment.

Referring further to FIG. 2, the electronic assembly 2, which is a mobile hard drive in the embodiment, may be retained removably in the retaining space 11, and has an outer surrounding surface 211 and a front end portion 21. The front end portion 21 is substantially tubular, and has a stepped surface 212 and a bottom surface 213. The stepped surface 212 is formed at a front end of the front end portion 21, and the bottom surface 213 is formed with two apertures 214. The outer surrounding surface 211 has two side areas 215 flanking the front end portion 21. When the electronic assembly 2 is retained in the retaining space 11, as shown in FIGS. 3 and 4, the outer surrounding surface 211 of the electronic assembly 2 faces the inner surrounding surface 111 of the main body 1, and the stepped surface 212 of the front end portion 21 is adjacent to the dividing wall 14 of the main body 1.

Referring back to FIG. 1 and further referring to FIG. 3, the waterproofing element 3 is sleeved on the outer surrounding surface 211 of the electronic assembly 2. In this embodiment, the waterproofing element 3 is configured to have a substantially T-shaped cross-section and has a surrounding body 31 and a flange 32. The surrounding body 31 has an internal surface 311 and an external surface 312, and the flange 32 protrudes from the external surface 312. When the waterproofing element 3 is sleeved on the electronic assembly 2, the internal surface 311 of the surrounding body 31 faces the electronic assembly 2 and contacts the outer surrounding surface 211 of the electronic assembly 2, and the flange 32 protrudes away from the outer surrounding surface 211 of the electronic assembly 2 for abutting against the inner surrounding surface 111 of the main body 1. When the electronic assembly 2 with the waterproofing element 3 sleeved thereon is retained in the retaining space 11, the waterproofing element 3 is disposed between and abuts tightly against the outer surrounding surface 211 of the electronic assembly 2 and the inner surrounding surface 111 of the main body 1, thereby achieving the effect that prevents any liquid from flowing therethrough.

Referring back to FIG. 1 and referring further to FIG. 5, in this embodiment, the engaging mechanism 4 is mounted in the front end portion 21 of the electronic assembly 2, and includes a pair of engaging members 41 and a resilient member 42. The resilient member 42, in this embodiment, is a compression spring disposed in the front end portion 21 and between the apertures 214. Each of the engaging members 41 has a first end part 411, a second end part 412 and an operating part 413 that is located between the first end part 411 and the second end part 412. In practice, the engaging member 41 is substantially elongated, and the operating part 413 is formed with a recess. The engaging members 41 are disposed in the front end portion 21 with the second end parts 412 thereof adjacent to each other and abutting resiliently and respectively with opposite ends of the resilient member 42. The first end parts 411 of the engaging members 41 are biased resiliently by the resilient member 42 to extend outwardly of the side areas 215 of the outer surrounding surface 211 of the electronic assembly 2. The operating parts 413 are accessibly and respectively exposed from the apertures 214 of the front end portion 21. When the operating parts 413 of the engaging members 41 are brought together, the resilient member 42 is squeezed, and the first end parts 411 of the engaging members 41 retract toward the resilient member 42.

To coordinate with the engaging mechanism 4, in this embodiment, the inner surrounding surface 111 of the main body 1 is formed with a pair of engaging recesses 13 corresponding in position to the first end parts 411 of the engaging members 41, respectively. When the electronic assembly 2 is retained in the retaining space 11, the first end parts 411 of the engaging members 41 fit respectively into the engaging recesses 13, thereby creating structural interference between the engaging mechanism 4 and the main body 1 so as to prevent the electronic assembly 2 from being easily separated from the retaining space 11. To remove the electronic assembly 2 from the retaining space 11, the operating parts 413 of the engaging members 41 have to be brought together to separate the first end parts 411 of the engaging members 41 from the engaging recesses 13, thereby disengaging the engaging mechanism 4 from the main body 1.

The engaging mechanism 4 may include only one engaging member 41 in other embodiments of this invention. As such, the end of the resilient member 42 opposite to the engaging member 41 is configured to abut against an internal part of the electronic assembly 2.

Moreover, the electronic assembly 2 and the inner surrounding surface 111 of the main body 1 may be formed respectively with a protrusion unit and a recess unit engagable with the protrusion unit for assisting retention of the electronic assembly 2 in the retaining space 11.

Figure 7:
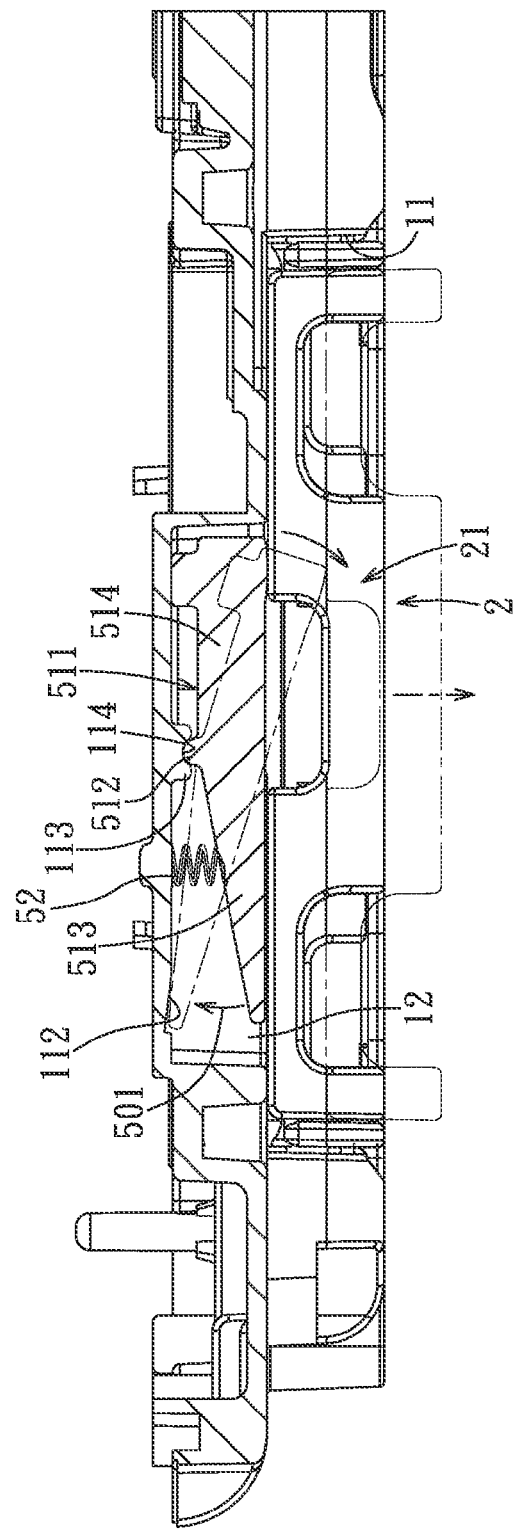
FIG. 7 is a sectional view of the embodiment illustrating the operation of the ejecting mechanism.

Referring back to FIG. 1 and further referring to FIGS. 6 and 7, the ejecting mechanism 5 includes an operating member 51, a spring member 52 and a securing component 53. The operating member 51 has a main portion 511 and a connecting portion 512 disposed on the main portion 511. In this embodiment, the main portion 511 is elongated and has a lifting section 514 and an operating section 513 that is connected to the lifting section 514. Additionally, the lifting section 514 has a lateral protrusion 516 that protrudes laterally therefrom.

The connecting portion 512 is configured as an axle projecting from the main portion 511 and located between the operating section 513 and the lifting section 514. The main portion 511 extends in a longitudinal direction 510 (see FIG. 1), and the connecting portion 512 extends in a transverse direction 519 transverse to the longitudinal direction 510, and has a projecting segment 515 projecting beyond the main portion 511. In this embodiment, a cross-section of the operating section 513 in the longitudinal direction 510 is wedge-shaped and is thinner than that of the lifting section 514.

The operating member 51 is disposed in the main body 1 with the main portion 511 thereof retained in the first groove 12 of the main body 1 and the connecting portion 512 thereof inserting rotatably in the second groove 114 of the main body 1 to achieve an effect as if the operating member 51 is pivotable in the second groove 114, while the lifting section 514 is located between the main body 1 and the front end portion 21 of the electronic assembly 2. Also, as shown in FIG. 4, the lateral protrusion 516 of the lifting section 514 is disposed between the stepped surface 212 of the electronic assembly 2 and the dividing wall 14 of the main body 1. The operating section 513 is spaced apart from the base surface 112. The spring member 52 is compression spring disposed in the first groove 12, and has opposite ends abutting resiliently against the base surface 112 of the main body 1 and the operating section 513 of the main portion 511 of the operating member 51. To secure the spring member 52, for example, each of the base surface 112 and the operating section 513 may be formed with a recess allowing a respective one of the ends of the spring member 52 to be inserted therein.

As shown in FIGS. 1, 4 and 7, the securing component 53 may be configured as a screw having a shaft part 532 and a head part 531 that extends radially from one end of the shaft part 532. The securing component 53 is fastened at a position adjacent to the first groove 12, and retains the projecting segment 515 of the connecting portion 512 of the operating member 51 between the head part 531 and the second groove 114, thereby positioning the operating member 51 in the first groove 12 and achieving an effect as if the connecting portion 512 is pivotably disposed between the head part 531 of the securing component 53 and the second groove 114. When assembling such configuration, the installation of the ejecting mechanism 5 can be completed by simply disposing the operating member 51 and the spring member 52 in the first groove 12 and then fastening the securing component 53, which is relatively simple. Certainly, the connecting portion 512 of the operating member 51 may be configured in another manner as a pivot axle disposed pivotably in the first groove 12 instead of the second groove 14.

Referring to FIGS. 1, 5 and 7, to remove the electronic assembly 2 from the retaining space 11, the operating parts 413 of the engaging member 41 of the engaging mechanism 4 have to be moved toward each other to disengage the first end parts 411 from the engaging recesses 13 of the inner surrounding surface 111 of the main body 1. Afterward, the operating section 513 of the main portion 511 is pushed by a force to rotate in a pushing direction 501 (see FIG. 7) to a position adjacent to the base surface 112 of the main body 1 (the spring member 52 is squeezed in the meantime). Since the operating member 51 is rotatable about the connecting portion 512 relative to the main body 1, the lifting section 514 is thus driven to move away from the base surface 112 together with the lateral protrusion 516, thereby pushing the electronic assembly 2 out of the retaining space 11 (the displacement of the operating member 51 is illustrated by arrows and dashed lines in FIG. 7). In this embodiment, the surface of the lifting section 514 that faces the base surface 112 of the front end portion 21 of the electronic assembly 2 may have a portion formed with a protrusion so as to increase the displacement that the electronic assembly 2 is pushed out of the retaining space 11.

When the force that pushes the operating section 513 is removed, a restoring force of the spring member 52 biases the operating section 513 back to the original position. The spring member 52 may be omitted, and the operating member 51 may be brought back to the original position through other kinds of mechanism or be moved manually.

To sum up, with the presence of the ejecting mechanism 5, when the engaging mechanism 4 is disengaged from the main body 1, the operating member 51 may be pressed to push the electronic assembly 2 out of the retaining space 11. Sven though the waterproofing element 3 is sleeved on the inner surrounding surface 111, the removal the electronic assembly 2 will not be obstructed by the friction of the waterproofing element 3 between the electronic assembly 2 and the main body 1.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device comprising:
   a main body formed with a retaining space;
   an electronic assembly retained removably in said retaining space of said main body; and
   an ejecting mechanism including an operating member that has a main portion and a connecting portion disposed on said main portion, said main portion having a lifting section and an operating section that is connected to said lifting section, said connecting portion being located between said lifting and operating sections, said operating member being rotatable on said connecting portion and disposed in said main body at a position adjacent to said retaining space while said lifting section is disposed between said main body and said electronic assembly, said operating section being operable by a force to rotate in a pushing direction to drive said lifting section to push said electronic assembly out of said retaining space;
   wherein said main body has an inner surrounding surface that defines said retaining space, said electronic assembly having an outer surrounding surface that faces said inner surrounding surface when said electronic assembly is retained in said retaining space, said electronic device further comprising a waterproofing element that is sleeved on said outer surrounding surface of said electronic assembly and that abuts against said inner surrounding surface of said main body when said electronic assembly is retained in said retaining space.

2. The electronic device as claimed in claim 1, wherein said waterproofing element is configured to have a substantially T-shaped cross-section, and has a surrounding body with an external surface and a flange protruding from said external surface, said surrounding body being sleeved on said outer surrounding surface of said electronic assembly, said flange abutting against said inner surrounding surface of said main body.

3. The electronic device as claimed in claim 1, wherein said main body is further formed with a first groove adjacent to said retaining space, said operating member being disposed in said first groove.

4. The electronic device as claimed in claim 3, wherein said main body further has a base surface defining said first groove, a block protruding from said base surface, and a second groove formed in said block, said connecting portion of said operating member being configured as an axle projecting from said main portion of said operating member and inserting rotatably in said second groove so as to locate rotatably said operating member in said first groove.

5. The electronic device as claimed in claim 4, wherein:
said main portion of said operating member extends in a longitudinal direction;
said connecting portion has a projecting segment projecting in a direction substantially transverse to the longitudinal direction;
said ejecting mechanism further including a securing component that is disposed in said main body and that has
a shaft part, and
a head part extending radially from one end of said shaft part; and
said projecting segment is disposed between said second groove and said head part of said securing component.

6. The electronic device as claimed in claim 4, wherein said ejecting mechanism further includes a spring member disposed in said first groove and having opposite ends that abut resiliently and respectively against said base surface of said main body and said main portion of said operating member.

7. The electronic device as claimed in claim 6, wherein a cross-section of said operating section of said operating member in the longitudinal direction is wedge-shaped.

8. The electronic device as claimed in claim 1, further comprising an engaging mechanism mounted in said electronic assembly and including:
an engaging member that is mounted movably in said electronic assembly and that has an operating part exposed accessibly from said electronic assembly, and a first end part extending outwardly of said outer surrounding surface of said electronic assembly; and
a resilient member disposed in said electronic assembly and biasing said first end part to extend resiliently and outwardly of said outer surrounding surface of said electronic assembly;
wherein said inner surrounding surface of said main body is formed with an engaging recess for engaging removably said first end part of said engaging member.

9. The electronic device as claimed in claim 8, wherein said electronic assembly has a front end portion mounted with said engaging mechanism, said operating member being disposed between said front end portion and said main body.

10. The electronic device as claimed in claim 3, wherein said main body further has a dividing wall separating said retaining space from said first groove, said electronic assembly having a front end portion formed with a stepped surface that is adjacent to said dividing wall when said electronic assembly is retained in said retaining space, said lifting section of said main portion of said operating member having a lateral protrusion that protrudes laterally therefrom and that is disposed between said stepped surface and said dividing wall when said electronic assembly is retained in said retaining space, said operating section being operable by a force to rotate in a pushing direction to drive said lateral protrusion to push said electronic assembly out of said retaining space.

* * * * *